US010432049B2

(12) United States Patent
Saint-Michel

(10) Patent No.: US 10,432,049 B2
(45) Date of Patent: Oct. 1, 2019

(54) ROTOR FOR A ROTARY ELECTRIC MACHINE

(71) Applicant: MOTEURS LEROY-SOMER, Angouleme (FR)

(72) Inventor: Jacques Saint-Michel, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 382 days.

(21) Appl. No.: 15/303,324

(22) PCT Filed: Apr. 9, 2015

(86) PCT No.: PCT/IB2015/052592
§ 371 (c)(1),
(2) Date: Oct. 11, 2016

(87) PCT Pub. No.: WO2015/155731
PCT Pub. Date: Oct. 15, 2015

(65) Prior Publication Data
US 2017/0040854 A1 Feb. 9, 2017

(30) Foreign Application Priority Data
Apr. 10, 2014 (FR) ..................... 14 53218

(51) Int. Cl.
*H02K 1/27* (2006.01)
*H02K 3/12* (2006.01)
(52) U.S. Cl.
CPC ............ *H02K 1/2766* (2013.01); *H02K 3/12* (2013.01)

(58) Field of Classification Search
CPC ........ H02K 1/27; H02K 15/03; H02K 1/2766; H02K 3/12
See application file for complete search history.

(56) References Cited

U.S. PATENT DOCUMENTS

| 3,126,493 A | 3/1964 | Honsinger |
| 3,375,383 A | 3/1968 | Philbrick |
| 3,840,763 A | 10/1974 | Baumann et al. |
| 3,845,547 A | 11/1974 | Reynolds |
| 4,204,314 A | 5/1980 | Workman |
| 4,327,302 A | 4/1982 | Hershberger |
| 4,476,736 A | 10/1984 | Hershberger |

(Continued)

FOREIGN PATENT DOCUMENTS

| CN | 101047325 A | 10/2007 |
| CN | 103187816 A | 7/2013 |

(Continued)

OTHER PUBLICATIONS

Oct. 26, 2015 International Search Report issued in International Patent Application No. PCT/IB2015/052590.

(Continued)

*Primary Examiner* — Mohamad A Musleh
(74) *Attorney, Agent, or Firm* — Oliff PLC

(57) ABSTRACT

A rotor for a rotary electric machine includes a magnetic rotor body and at least two permanent magnets defining a pole of the rotor, the two permanent magnets being arranged on either side of a radial axis of the pole in a common recess which is provided in the magnetic rotor body and through which the radial axis of the pole passes.

14 Claims, 3 Drawing Sheets

(56) References Cited

U.S. PATENT DOCUMENTS

Figure 1:
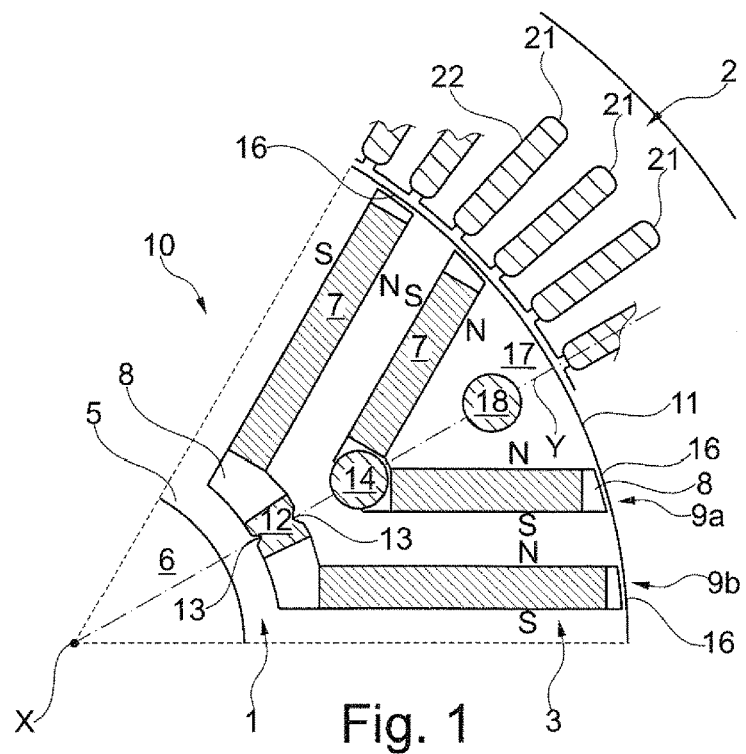

| | | | |
|---|---|---|---|
| 4,924,130 A | 5/1990 | Fratta | |
| 5,191,256 A | 3/1993 | Reiter, Jr. et al. | |
| 5,510,662 A | 4/1996 | Tanimoto et al. | |
| 5,936,326 A | 8/1999 | Umeda et al. | |
| 6,008,559 A * | 12/1999 | Asano | H02K 1/2766 310/156.53 |
| 6,025,667 A | 2/2000 | Narita et al. | |
| 6,047,460 A * | 4/2000 | Nagate | H02K 1/276 205/137 |
| 6,121,706 A | 9/2000 | Nashiki et al. | |
| 6,124,660 A | 9/2000 | Umeda et al. | |
| 6,147,428 A * | 11/2000 | Takezawa | H02K 1/2766 310/156.57 |
| 6,181,043 B1 | 1/2001 | Kusase et al. | |
| 6,225,724 B1 * | 5/2001 | Toide | H02K 1/276 310/156.53 |
| 6,265,801 B1 | 7/2001 | Hashiba et al. | |
| 6,555,940 B2 | 4/2003 | Naito et al. | |
| 6,703,746 B2 | 3/2004 | Biais et al. | |
| 7,042,129 B2 | 5/2006 | Neet | |
| 7,337,525 B2 | 3/2008 | Ueda et al. | |
| 7,436,095 B2 | 10/2008 | Aydin et al. | |
| 7,474,029 B2 | 1/2009 | Rahman et al. | |
| 7,504,754 B2 | 3/2009 | Jahns et al. | |
| 7,649,294 B2 | 1/2010 | Koike | |
| 8,044,548 B2 | 10/2011 | Sakai et al. | |
| 8,193,676 B2 | 6/2012 | Hashimoto et al. | |
| 8,225,491 B2 | 7/2012 | Hashimoto et al. | |
| 8,256,094 B2 | 9/2012 | Akimoto et al. | |
| 8,294,324 B2 | 10/2012 | Ishigami et al. | |
| 8,427,024 B2 | 4/2013 | Watanabe et al. | |
| 8,587,177 B2 | 11/2013 | Kitamura et al. | |
| 8,884,489 B2 | 11/2014 | Yamada et al. | |
| 9,276,443 B2 | 3/2016 | Saito et al. | |
| 9,748,806 B2 | 8/2017 | Koka et al. | |
| 9,923,438 B2 | 3/2018 | Ito et al. | |
| 2002/0036436 A1 * | 3/2002 | Koharagi | H02K 1/2766 310/156.53 |
| 2002/0175584 A1 | 11/2002 | Koharagi et al. | |
| 2004/0040142 A1 | 3/2004 | Hirota et al. | |
| 2004/0046472 A1 | 3/2004 | Noda et al. | |
| 2005/0082924 A1 | 4/2005 | Fukasaku et al. | |
| 2005/0116572 A1 | 6/2005 | Fukasaku et al. | |
| 2005/0133655 A1 | 6/2005 | Hashimoto et al. | |
| 2007/0126304 A1 | 6/2007 | Ito et al. | |
| 2007/0228862 A1 | 10/2007 | Welchko et al. | |
| 2008/0054750 A1 | 3/2008 | Koike | |
| 2008/0231135 A1 * | 9/2008 | Suzuki | H02K 1/2766 310/156.53 |
| 2009/0261667 A1 * | 10/2009 | Matsubara | H02K 1/2766 310/54 |
| 2010/0001609 A1 | 1/2010 | Ishigami et al. | |
| 2010/0079026 A1 | 4/2010 | Han et al. | |
| 2010/0127584 A1 * | 5/2010 | Gottfried | H02K 1/2766 310/61 |
| 2012/0007460 A1 | 1/2012 | Kitamura et al. | |
| 2012/0139378 A1 * | 6/2012 | Endo | H02K 1/2766 310/156.21 |
| 2012/0200187 A1 | 8/2012 | Sano et al. | |
| 2012/0319523 A1 | 12/2012 | Manabu et al. | |
| 2013/0015727 A1 | 1/2013 | Iki | |
| 2013/0026871 A1 | 1/2013 | Van Dam et al. | |
| 2013/0147299 A1 | 6/2013 | Rahman et al. | |
| 2014/0021823 A1 | 1/2014 | Kitamura et al. | |
| 2014/0042860 A1 | 2/2014 | Rahman et al. | |
| 2014/0117791 A1 * | 5/2014 | Fiseni | H02K 29/03 310/48 |
| 2014/0175916 A1 * | 6/2014 | Chamberlin | H02K 9/19 310/54 |
| 2014/0225465 A1 | 8/2014 | Goto | |
| 2014/0246938 A1 * | 9/2014 | Lillington | H02K 1/2746 310/156.01 |
| 2014/0292132 A1 * | 10/2014 | Kazmin | H02K 1/2766 310/156.01 |
| 2015/0115758 A1 | 4/2015 | Koka et al. | |
| 2017/0141632 A1 | 5/2017 | Hashimoto et al. | |
| 2017/0264157 A1 | 9/2017 | Koga et al. | |
| 2017/0264173 A1 | 9/2017 | Koga et al. | |

FOREIGN PATENT DOCUMENTS

| | | |
|---|---|---|
| CN | 103208872 A | 7/2013 |
| CN | 103580332 A | 2/2014 |
| DE | 10345417 A1 | 5/2005 |
| EP | 2611002 A2 | 7/2013 |
| EP | 2615724 A2 | 7/2013 |
| EP | 3285366 A1 | 2/2018 |
| FR | 2801142 A1 | 5/2001 |
| GB | 2491573 A | 12/2012 |
| JP | H10-271716 A | 10/1998 |
| JP | 2875497 B2 | 3/1999 |
| JP | 2011-097723 A | 5/2011 |
| WO | 2013/061903 A1 | 5/2013 |
| WO | 2013/161474 A1 | 10/2013 |
| WO | 2014/157218 A1 | 10/2014 |
| WO | 2016/035766 A1 | 3/2016 |

OTHER PUBLICATIONS

Oct. 6, 2015 International Search Report issued in International Patent Application No. PCT/IB2015/052593.

Oct. 6, 2015 International Search Report issued in International Patent Application No. PCT/IB2015/052592.

Oct. 12, 2016 International Preliminary Report on Patentability issued in International Patent Application No. PCT/IB2015/052590.

Oct. 12, 2016 International Preliminary Report on Patentability issued in International Patent Application No. PCT/IB2015/052592.

Oct. 12, 2016 International Preliminary Report on Patentability issued in International Patent Application No. PCT/IB2015/052593.

U.S. Appl. No. 15/303,432, filed Oct. 11, 2016.

U.S. Appl. No. 15/303,261, filed Oct. 11, 2016.

Apr. 28, 2018 Office Action issued in Chinese Patent Application No. 201580019065.3.

Apr. 26, 2018 Office Action issued in Chinese Patent Application No. 201580019046.0.

Feb. 8, 2019 Office Action issued in U.S. Appl. No. 15/303,432.

May 13, 2019 U.S. Office Action issued U.S. Appl. No. 15/303,261.

* cited by examiner

ROTOR FOR A ROTARY ELECTRIC MACHINE

The present invention relates to rotary electric machines, notably synchronous motors, and more particularly to the rotors of such machines. The invention is concerned with permanent magnet rotors which use flux concentration. By virtue of the latter, the induction obtained in the air gap is greater than the induction in the magnets.

Permanent magnet rotors comprise a rotor magnetic mass in which the permanent magnets are housed, said permanent magnets being inserted in housings that are frequently oriented radially.

In known rotors, in order to obtain sufficient induction levels in the air gap and to have compact machines, it may be necessary to use magnets that have a high energy density and are thus expensive. Specifically, such magnets are manufactured with rare earths.

In other machines, use is made of magnets having low energy per unit volume, which are made of ferrite, but such machines have the drawback of requiring a high polarity or rotors with a very large diameter in order to obtain levels of induction in the air gap that are comparable with what may be obtained with magnets having high energy per unit volume. A high polarity machine requires high frequencies and hence significant losses in the motor in the form of iron losses and in the inverter in the form of switching losses. Such machines having a high polarity and having magnets with a low energy density are thus used at limited speeds.

Also known are rotary electric machines comprising non-radial permanent magnets that are disposed for example in a V shape or a U shape, in housings which may be disposed in rows separated by magnetic material bridges.

The presence of these bridges may cause magnetic leakage, which can have a detrimental effect on the resulting electromagnetic torque. This problem may be even more significant when low energy magnets are used.

Thus, the rotors of rotary electric machines do not make it possible to provide machines having a relatively low polarity, for example less than eight or even six poles, with effective use of the magnets, notably magnets made of ferrite and/or with a low energy density, and with sufficient electromagnetic torque.

Therefore, there is a need to benefit from a rotor of a rotary electric machine that allows more effective use of the magnets, notably magnets made of ferrite and/or with a low energy density, and optionally with polarity which is not necessarily high.

The invention aims to meet all or part of this need and achieves this, according to one of its aspects, by virtue of a rotor for a rotary electric machine, comprising a rotor magnetic mass and at least two permanent magnets defining a pole of the rotor, the two permanent magnets being disposed on either side of a radial axis Y of said pole in a common housing which is formed in the rotor magnetic mass and through which the radial axis Y of the pole passes.

In one exemplary embodiment of the invention, the two permanent magnets are each disposed entirely on one and the same side of the radial axis of the pole.

Since the two permanent magnets are disposed in a common housing, the rotor does not have a magnetic material bridge between these two magnets and short-circuiting the flux of the magnets, and so magnetic leakage may be reduced thereby.

The term "radial axis of the pole" means an axis Y of the pole that is oriented radially, that is to say along a radius of the rotor. It may be an axis of symmetry of the pole. This radial axis may intersect the apex of the pole.

A housing may be U-shaped or V-shaped.

For one and the same pole, the rotor may comprise at least two housings, one housing having lateral branches parallel to the lateral branches of the other housing.

A housing may also comprise a central branch connecting the two lateral branches, it being possible for said central branch not to have a magnet. The central branch may be in the form of an arc centered on the axis of rotation of the rotor. The rotor may comprise another V-shaped housing.

The rotor may comprise at least one spacer disposed in the housing between the two permanent magnets. The presence of the spacer makes it possible to ensure the opening of the housing between the two permanent magnets, and to avoid a situation in which the walls of the housing move toward one another under the effect of the mechanical forces that arise during operation. Thus, the mechanical integrity of the rotor can be improved thereby and torque transmission promoted, and this may be useful notably in the case of a higher speed of rotation, for example in the case in which the peripheral speed of the rotor (tangential speed measured at the outside diameter of the rotor) is greater than 70 m/s. This spacer may also make it possible to improve the centering of the rotor or to minimize the use of imbalances.

The spacer may be disposed on the radial axis Y of the pole.

The spacer may be in contact with the magnets or, by contrast, not be in contact with the magnets.

The spacer is non-magnetic. Thus, the presence of the spacer does not constitute a possible passage for the magnetic flux.

The spacer may have a cross section with an overall shape chosen from the following list: circular, polygonal, square, rectangular, trapezoidal, this list not being limiting. The spacer may extend along a longitudinal axis parallel to the axis of rotation of the rotor.

The spacer may comprise one or more longitudinal slots, for example two slots, facing away from one another. The spacer may notably comprise two longitudinal slots that are disposed one on each side of a separation plane parallel to the axis of rotation of the rotor and perpendicular to the radial axis of the corresponding pole. The separation plane may or may not be a plane of symmetry for the spacer. The presence of these slots, which cooperate with corresponding reliefs on the magnetic mass of the rotor, may make it possible to ensure the wedging of the spacer in the housing and to avoid any displacement of the spacer under the effect of centrifugal forces.

The spacer, more particularly the slotted spacer, may be housed in the central branch of the housing, notably in the central arc-shaped branch centered on the axis of rotation of the rotor. The spacer may be disposed in a manner set back from the lateral branches of the housing.

The rotor magnetic mass may comprise at least one pole piece connected to the rest of the magnetic mass by tangential bridges that are formed between each of the two ends of the housing and the outer surface of the rotor.

It is possible for the rotor not to have any material bridges other than tangential material bridges. The term "tangential bridge" denotes a material bridge formed between a housing and the air gap. In this case, the rotor does not have radial bridges as described above. This may allow a considerable improvement in electromagnetic performance.

The magnets of a housing may be disposed in a manner set back from the corresponding tangential bridges, and may not be in contact with the latter.

The absence of radial magnetic bridges between the two permanent magnets may reduce the mechanical strength of the rotor. If the rotational speed is sufficiently low, for example when the peripheral speed of the rotor is less than 70 m/s, the presence of tangential bridges may suffice to ensure the cohesion of the rotor.

The rotor magnetic mass may comprise at least one pole piece independent of the rest of the rotor magnetic mass. The term "independent" should be understood as meaning that the pole piece is not formed in one piece with the rest of the laminations. Thus, in this case, the rotor mass does not have tangential bridges as defined above. The pole piece may be kept secured to the rotor mass by any other means, notably an added means, for example by a longitudinal tie rod that passes through it and is fastened to one or more end plates of the rotor.

The rotor may also comprise at least one tie rod for holding the pole piece. The tie rod may be configured to pass through the pole piece and to be fastened to one or more end plates of the rotor.

The rotor may comprise at least one end plate, or even two end plates, to which the spacers and possible tie rods may be fastened, if necessary. The rotor may also comprise one or more intermediate plates that are disposed in the magnetic mass, that is to say in the stack of magnetic laminations of the rotor magnetic mass.

Rows of Permanent Magnets

The permanent magnets may be disposed in concentric rows, notably in two concentric rows, for example each disposed in a housing common to all the magnets in the row. The rows may each be V-shaped or U-shaped. The term "row" denotes a succession of at least two permanent magnets. A row is not necessarily linear in any case. Instead, a row may be U-shaped or V-shaped.

This disposition in several concentric rows makes it possible to improve the concentration of the flux without necessarily having to increase the size of the housings or the quantity of permanent magnets that are necessary to obtain an equivalent flux.

The disposition of the magnets in rows makes it possible to obtain high saliency in each pole of the machine. The machine is thus a motor having high saliency torque, also referred to as a synchronous reluctance motor. The term "saliency of a pole" means that the reluctance varies along the pole in the air gap during the rotation of the rotor.

In one exemplary embodiment, the permanent magnets are disposed in Vs oriented toward the air gap. For one and the same pole, a row of permanent magnets thus comprises two lateral branches and does not have a central branch. The magnets of the lateral branches are in this case disposed in the lateral branches of the housing. The housing may be U-shaped, with a central branch which in this case does not have a magnet.

The Vs of one and the same pole are disposed concentrically; in other words, the Vs of one and the same pole are nested in one another.

The Vs are oriented toward the air gap. The term "V oriented toward the air gap" means that the V is open in the direction of the air gap. Each lateral branch of a V may be formed by a single permanent magnet. In a variant, each lateral branch of a V is formed by more than one permanent magnet, notably by two magnets that form, for example, each branch of the V. Such segmentation of the magnets may make it possible to improve the circulation of the flux in the rotor mass and/or to introduce bridges so as to stiffen the latter.

A branch of a V may be formed of several magnets, for example two magnets. Two magnets in a branch of the V may be aligned. In a variant, the magnet or magnets forming a branch of a V may each extend along an axis, the two axes making an angle $\alpha$ between one another. This angle $\alpha$ may be between 0° and 45°.

At least one row of permanent magnets may have no central magnet, or all the rows of a pole have no central magnet. The term "central magnet" means a magnet disposed on the radial axis of the corresponding pole. Thus, in one variant embodiment, the rows only comprise permanent magnets that are each disposed entirely on one side of the longitudinal axis of the corresponding pole.

Shared Permanent Magnets

The permanent magnets may define magnetic poles of the rotor, namely a first pole and a second pole adjacent to the first pole, the first and second poles having different polarities, permanent magnets inherent to the first pole contributing only to the polarity of the first pole and at least one shared permanent magnet contributing in part to the polarity of the first pole and in part to the polarity of the second pole.

In this embodiment, the rotor comprises at least one permanent magnet shared between two consecutive poles. The term "shared permanent magnet" means a permanent magnet that is common to the definition of two consecutive poles of the rotor. This magnet may thus be disposed on an interpolar axis. At least one permanent magnet defining said first pole also defines the second pole of the rotor that is adjacent to the first pole. The limit between the two consecutive poles passes through at least one permanent magnet.

When the permanent magnets are disposed in rows, the first pole of the rotor may be defined by at least one first row of inherent permanent magnets and by at least one second row of shared permanent magnets, said second row also defining, at least in part, the second pole of the rotor that is adjacent to the first pole.

In other words, the second row of permanent magnets simultaneously defines each of the two consecutive poles of the rotor between which it is situated. The shared permanent magnet belongs to the second row of permanent magnets.

Moreover, in this case, each pole may be said to be defined by a non-integer number of rows, being equal to the number of first rows plus a half; in other words, the second row defining said pole counts for half, given the use of the magnets in the second row to simultaneously define two consecutive poles of the rotor.

Thus, for a given diameter of the rotor, the number of rows per pole may be higher, such that the total quantity of permanent magnets may be greater, with equivalent bulk.

Moreover, the saliency ratio may be increased thereby, since the magnets shared between two consecutive poles may form a barrier to the circulation of the direct magnetic flux without affecting the magnetic flux in quadrature. Given a constant quantity of permanent magnets, the electromotive force may be greater and have fewer harmonics, since the passage of the induction through zero on the interpolar axis is more restricted angularly.

By virtue of the disposition of the magnets in the rotor mass, sufficient levels of induction are obtained in the air gap, even with relatively low polarity of the rotor, for example less than 6, with magnets having high energy per unit volume, such as magnets made of rare earths, not necessarily being used but, by contrast, magnets having low energy per unit volume, for example those made of ferrite. The cost of the rotor may thus be reduced thereby. Moreover, the polarity of the rotor may be reduced if the application so requires. Specifically, the rotor according to the invention makes it possible to increase the level of induction in the air gap without increasing the polarity and by using low energy density magnets.

Permanent Magnets

The permanent magnets preferably have a rectangular shape in cross section. In a variant, the width of a magnet measured in cross section perpendicularly to the axis of rotation may narrow when facing toward the air gap. The permanent magnets may have a trapezoidal overall shape in cross section. In a further variant, the magnets may have a curved cross section, for example in the form of a ring sector.

The permanent magnets may have a width of between 4 and 20 mm. At least one magnet in a first row, or at least half the magnets in a first row, or all the magnets in a first row, may have a width greater than 4 mm, better still greater than 8 mm, or even greater than 12 mm.

The magnet or magnets in a second row of permanent magnets may be the same width as the magnets in a first row, or, in a variant, have a different width, notably a greater width. Thus, at least one shared permanent magnet may be wider in cross section than an inherent permanent magnet, being for example twice as wide as an inherent permanent magnet. Such a configuration may make it possible to minimize, or better still to eliminate, any circulation of the flux between two adjacent poles, notably direct magnetic flux, without affecting the magnetic flux in quadrature, and thus to reduce the harmonic content. The efficiency may be improved thereby. In addition, the number of material bridges, notably of radial bridges, may be reduced thereby, such that the electromagnetic torque is improved.

The first pole may comprise a single first row, or each of the poles of the rotor may comprise a single first row.

In a variant, said first pole may comprise at least two first rows, or each of the poles of the rotor may comprise at least two first rows, notably two, or three, or even more. In one embodiment, the first pole comprises two first rows. Each of the poles of the rotor may comprise two first rows.

The rotor may have a number of poles of between 2 and 12, better still between 4 and 10. The number of poles of the rotor may be less than or equal to 8, or less than or equal to 6, being for example equal to 4 or 6.

The permanent magnets may be made of ferrites or with rare earths or with any other type of magnetic material. The permanent magnets may in particular be made at least partially of ferrite. It is possible for example for them not to contain rare earths, or at the very least to contain less than 50% by mass of rare earths. The disposition of the magnets makes it possible to concentrate the flux of the magnets and to obtain advantageous performance with ferrite magnets.

Housings

A housing may have a cross section with a rectangular overall shape. At least one housing may extend radially along a length greater than the radial length of the corresponding magnet, in cross section. The shape of the housing in cross section may be chosen so as to optimize the induction waveform in the air gap. By way of example, at least one end of the housing may have a rectangular, triangular or curved shape in cross section perpendicularly to the axis of rotation.

The rows may have a decreasing length in the direction of the air gap, the longest being closer to the axis of rotation and the shortest by the air gap.

The disposition of the housings and/or of the permanent magnets in a row is preferably symmetrical with respect to the radial axis of the pole.

The housings may have a constant or variable width along their longitudinal axis, in a plane perpendicular to the axis of rotation of the rotor.

Rotor Mass and Shaft

The rotor may comprise a shaft extending along the axis of rotation, the rotor magnetic mass being disposed on said shaft. The shaft may be made of a magnetic material, advantageously making it possible to reduce the risk of saturation in the rotor mass and to improve the electromagnetic performance of the rotor. The shaft may comprise a magnetic sleeve in contact with the rotor mass, the sleeve being mounted on a magnetic or non-magnetic spindle.

In a variant, the rotor may comprise a non-magnetic shaft on which the rotor mass is disposed. The shaft may for example be made at least in part from a material from the following list, which is not limiting: steel, stainless steel, titanium or any other non-magnetic material. The rotor mass may, in one embodiment, be disposed directly on the non-magnetic shaft, for example without an intermediate rim. In a variant, notably when the shaft is not non-magnetic, the rotor may comprise a rim that surrounds the shaft of the rotor and bears against the latter.

The rotor mass extends along the axis of rotation and is disposed around the shaft. The shaft may comprise torque transmitting means for driving the rotor mass in rotation.

The rotor mass may be formed from a stack of magnetic lamination layers. The stack of magnetic lamination layers may comprise a stack of magnetic laminations, each in one piece, each lamination forming a layer of the stack.

A lamination may comprise a succession of sectors connected by tangential material bridges.

Each rotor lamination is for example cut out of a sheet of magnetic steel, for example steel with a thickness of 0.1 to 1.5 mm. The laminations may be coated with an electrically insulating varnish on their opposing faces before they are assembled within the stack. The insulation may also be obtained by a heat treatment of the laminations.

In a variant, the rotor mass may comprise a plurality of pole pieces assembled on the shaft of the rotor, which is preferably non-magnetic in this case. Assembly may be effected by dovetails on a shaft of the machine, or in a variant by means of tie rods as mentioned above. Each pole piece may comprise a stack of magnetic laminations.

The distribution of the housings is advantageously regular and symmetrical, making it easier to cut out the rotor lamination and facilitating mechanical stability after cutting when the rotor mass is made up of a superposition of rotor laminations.

The number of housings and magnets depends on the polarity of the rotor. The rotor mass may comprise any number of housings, for example between 4 and 96 housings, better still between 8 and 40 housings, or even between 12 and 32 housings.

The magnets may be embedded in the rotor mass. In other words, the magnets are covered by portions of magnetic laminations at the air gap. The surface of the rotor at the air gap may be defined entirely by the edge of the layers of magnetic laminations and not by the magnets. The housings therefore do not lead radially toward the outside.

The rotor mass may comprise one or more holes in order to lighten the rotor, allow it to be balanced or to assemble the rotor laminations of which it is made up. Holes may allow the passage of tie rods that keep the laminations secured together.

The layers of laminations may be snap-fastened to one another.

The housings may be filled at least partially with a non-magnetic synthetic material. This material may lock the magnets in place in the housings and/or increase the cohesion of the set of laminations.

If necessary, the rotor mass may comprise one or more reliefs that help to position the magnets properly, notably in the radial direction.

The rotor mass may have a circular or multilobe outer contour, a multilobe shape possibly being useful for example for reducing torque undulations or current or voltage harmonics.

The rotor may or may not be mounted with an overhang.

The rotor may be made of several pieces of rotor that are aligned in the axial direction, for example three pieces. Each of the pieces may be offset angularly with respect to the adjacent pieces (known as a "step skew").

Machine and Stator

A further subject of the invention is a rotary electric machine, such as a synchronous motor or a synchronous generator, comprising a rotor as defined above. The machine may be a reluctance motor. It may constitute a synchronous motor.

The machine may operate at a nominal peripheral speed (tangential speed measured at the outside diameter of the rotor) which may be greater than or equal to 100 meters per second. Thus, the machine according to the invention allows operation at high speeds, if so desired. For example, a rotor with a diameter of 100 mm may operate quite safely at a speed of 20 000 revolutions per minute.

The machine may have a relatively large size. The diameter of the rotor may be greater than 50 mm, better still greater than 80 mm, being for example between 80 and 500 mm.

The rotor may be internal or external.

The machine may also comprise a stator, which may have concentrated or distributed winding. The machine may in particular comprise a stator having distributed winding, notably when the number of poles of the rotor is less than 8. In a variant, the stator may be wound on teeth.

The stator may comprise slots for receiving the windings, said slots being closed on the air gap side, being notably open on the opposite side from the air gap. Moreover, the stator may comprise diamond-shaped slots, and this may make it possible to improve the filling of the slots and thus the electromagnetic performance. Finally, use may be made of wires having a flattened cross section, being in the form of a flat, so as to increase the area of copper with respect to the useful area of the slot in cross section.

Figure 2:
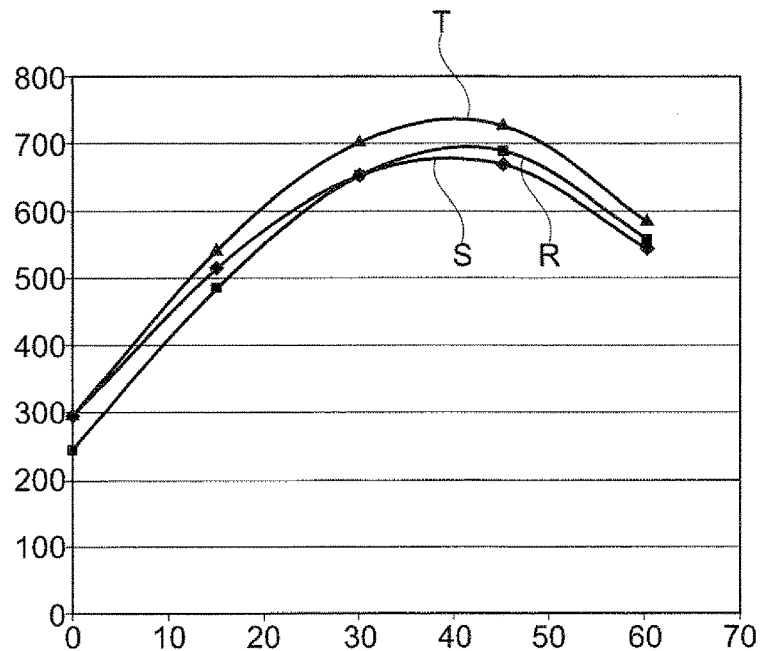

The invention may be understood better from reading the following detailed description of non-limiting exemplary embodiments thereof and from studying the appended drawing, in which:

FIG. 1 schematically and partially shows a cross section through a rotor produced in accordance with the invention, FIG. 2 illustrates the variation in the resulting torque depending on the presence or absence of material bridges, and FIGS. 3 to 6 are views similar to FIG. 1, illustrating variant embodiments.

FIG. 1 illustrates a rotary electric machine 10 comprising a rotor 1 and a stator 2.

The stator 2 comprises for example a distributed winding 22. It comprises slots 21 that are open toward the air gap, the electrical conductors of the winding 22 being disposed in said slots. This stator makes it possible to generate a rotary magnetic field for driving the rotor in rotation, within the context of a synchronous motor, and in the case of an alternator, the rotation of the rotor induces an electromotive force in the windings of the stator.

The rotor 1 shown in FIG. 1 comprises a rotor magnetic mass 3 extending axially along the axis of rotation X of the rotor, this rotor mass being formed for example by a set of magnetic laminations stacked along the axis X, the laminations being for example identical and superposed exactly. They may be held together by clip-fastening, by rivets, by tie rods, welds or any other technique. The magnetic laminations are preferably made of magnetic steel. All grades of magnetic steel may be used.

The rotor mass 3 comprises a central opening 5 for mounting it on a shaft 6. The shaft 6 may, in the example in question, be made of a non-magnetic material, for example of non-magnetic stainless steel or of aluminum, or else be magnetic.

The rotor 1 comprises a plurality of permanent magnets 7 disposed in housings 8 in the rotor magnetic mass 3. In the example described, the permanent magnets 7 are disposed in two rows 9a, 9b defining the six poles 11 of the rotor. Each of the rows 9a, 9b comprises two permanent magnets 7, which are disposed one on each side of a radial axis Y of said pole 11.

The permanent magnets 7 are both disposed in a common housing 8 that is formed in the rotor magnetic mass 3 and passed through by the radial axis Y of the pole. This housing 8 extends from the air gap in the direction of the shaft, and then back toward the air gap. The housings 8 are V-shaped or U-shaped.

The permanent magnets 7 are disposed in Vs oriented toward the air gap. For one and the same pole, a row of permanent magnets thus comprises two lateral branches. The Vs of one and the same pole are disposed concentrically; in other words, the Vs of one and the same pole are nested in one another. In the example described, a V has a shape that flares toward the air gap, the lateral branches of the V not being parallel to one another. None of the rows of a pole have a central magnet.

The permanent magnets 7 have a rectangular shape in cross section. They may be made of ferrite or, alternatively, of rare earths, for example of the neodymium type or the like. Preferably, the magnets are made of ferrite.

In the example illustrated in FIG. 1, the rotor comprises tangential bridges 16 formed between a housing 8 and the air gap. It does not have any material bridges other than tangential material bridges and in particular does not have radial bridges.

In order to explain the advantage of a rotor having only tangential bridges 16, FIG. 2 illustrates the resulting torque (in Nm) depending on the setting angle in degrees for different rotors. The best results in terms of torque are obtained with a rotor in accordance with the invention that comprises only tangential bridges 16 (curve T), compared with a rotor without bridges (curve S) or a rotor having both radial bridges and tangential bridges (curve R). As will be understood from studying this FIG. 2, the presence of radial bridges is particularly detrimental to the creation of torque, while the presence of tangential bridges is favorable to torque. One explanation may be that the presence of tangential bridges may make it possible to reduce magnetic disturbances in the magnetic mass at the air gap.

The rotor in FIG. 1 also comprises two spacers 12 and 14 that are each disposed in one of the housings 8 between the two corresponding permanent magnets 7. The spacer 12 is disposed in the housing 8 closest to the shaft and has a somewhat trapezoidal shape in cross section. It also comprises two longitudinal slots 13 for wedging it in the housing by cooperation with corresponding ribs on the rotor mass. The spacer 14 is disposed in the housing 8 closest to the air gap and has a circular shape in cross section. It does not have a longitudinal slot.

The rotor magnetic mass 3 comprises, for each pole, a pole piece 17 connected to the rest of the magnetic mass by tangential bridges 16 that are formed between each of the two ends of the housing and the outer surface of the rotor.

Figure 3:
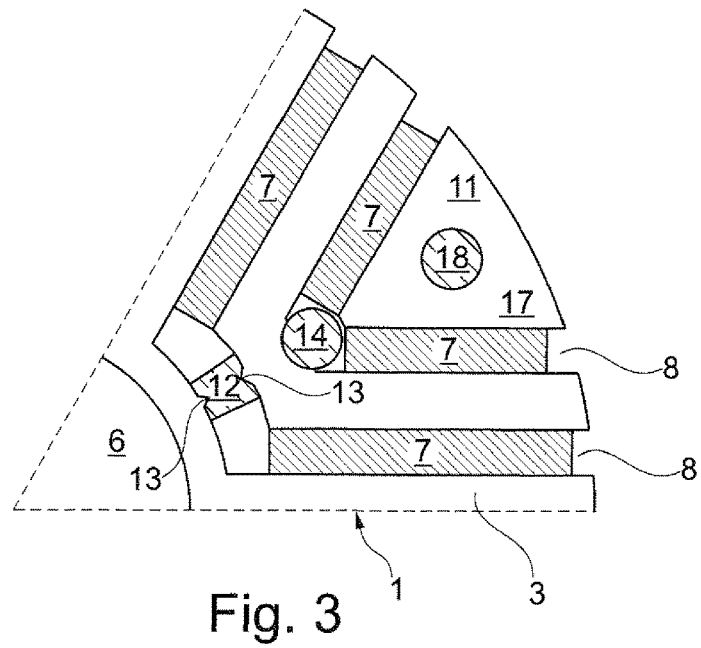

In one variant embodiment, illustrated in FIG. 3, the rotor magnetic mass 3 comprises pole pieces 17 that are independent of the rest of the rotor magnetic mass.

The rotor comprises at least one tie rod 18 for holding the pole piece 17. It may also comprise at least one end plate, better still two end plates, to which the spacers and possible tie rods may be fastened, if necessary.

Figure 4:
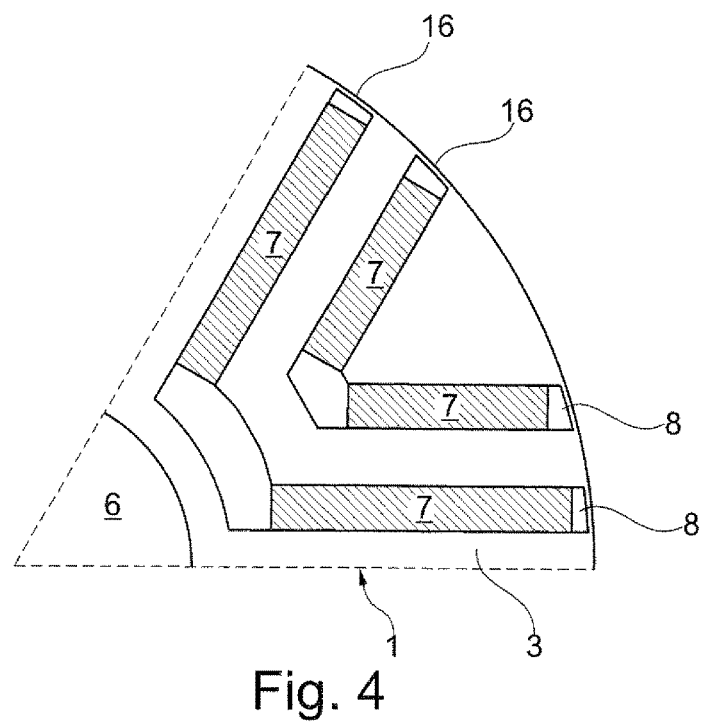

In the example described with reference to FIG. 1, the rotor comprises spacers 12, 14 disposed in the housings 8 between the two corresponding permanent magnets 7. Of course, if this is not the case, and if the rotor does not have a spacer, or tie rod, or either of these, this does not represent a departure from the scope of the present invention. By way of example, FIG. 4 illustrates a rotor comprising housings 8 that only receive permanent magnets 7 but not having any intermediate spacer. Similarly, this rotor does not have a tie rod passing through the pole pieces.

In one variant embodiment, the permanent magnets 7 may be disposed in two rows 9a, 9b defining the six poles 11 of the rotor, namely a first pole and a second pole adjacent to the first pole, the first and second poles having different polarities. The polarity of the first pole of the rotor is defined by a first row 9a (or several first rows 9a) of inherent permanent magnets 7 and by a second row 9b of shared permanent magnets 7, said second row 9b likewise defining in part the polarity of the second pole of the rotor that is adjacent to the first pole.

Figure 5:
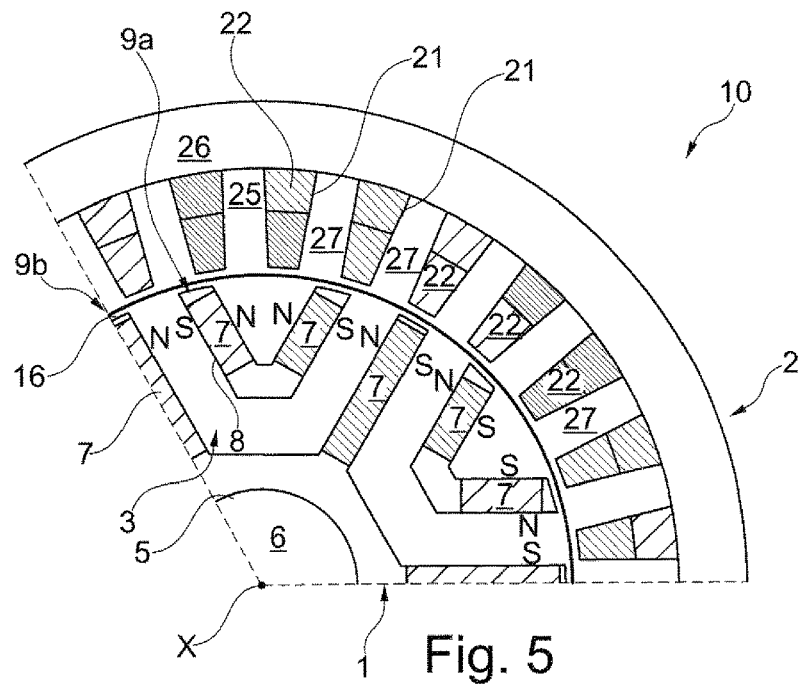
Figure 6:
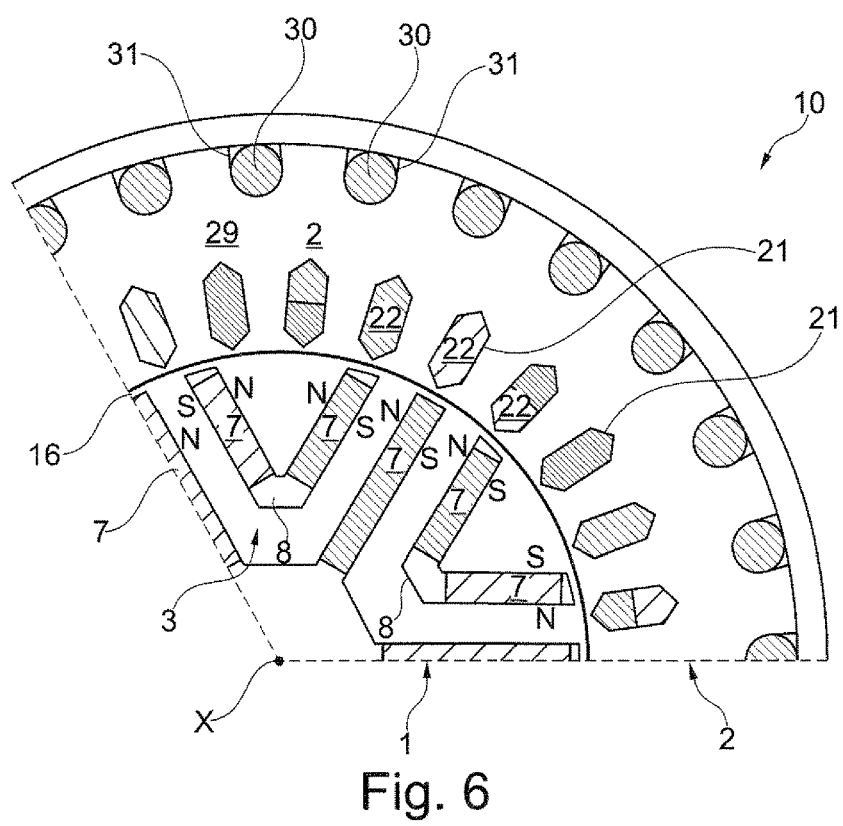

Machines 10 comprising such a rotor are illustrated in FIGS. 5 and 6. The shared permanent magnet 7 that contributes to the polarity of the first pole likewise contributes to the polarity of the second pole of the rotor that is adjacent to the first pole. The second row 9b of permanent magnets 7 thus simultaneously defines the polarities of each of the two consecutive poles of the rotor between which it is situated. The limit between the two consecutive poles passes through at least said shared permanent magnet 7.

In these examples illustrated in FIGS. 5 and 6, each of the poles of the rotor comprises a single first row. The first row of each of the poles is disposed in a V shape in these examples, the concavity of the row being oriented toward the apex of the pole, that is to say toward the air gap. It could of course be different, and the rotor could comprise for example two first rows, or more.

The embodiment illustrated in FIG. 5 also differs from the one illustrated in FIG. 1 in that the stator 2 comprises slots 21 for receiving windings, said slots being closed on the air gap side. Moreover, these slots 21 are open on the side away from the air gap. The stator 2 comprises a one-piece ring gear 25 and an attached annular yoke 26. The stator has fractionally distributed winding, comprising slots 21 formed in the ring gear 25. The slots 21 have a trapezoidal cross section and the teeth 27 separating the slots have mutually parallel edges. The slots 21 are filled from the outside. After winding, the whole is inserted into the attached annular yoke 26.

The variant embodiment illustrated in FIG. 6 differs from the one illustrated in FIG. 5 by the configuration of the stator, which comprises diamond-shaped slots 21, and this may make it possible to improve the filling of the slots 21 and thus the electrical performance. The stator in FIG. 4 also comprises a yoke 29 equipped with semicircular longitudinal ribs 31 that are intended to accommodate ducts 30 for the circulation of a cooling liquid.

Of course, the invention is not limited to the exemplary embodiments which have just been described.

The laminations may for example be produced with holes for allowing the passage of tie rods for assembling the laminations of the rotor mass.

Moreover, the rotors described may be combined with any of the stators described.

The expression "comprising a" should be understood as being synonymous with "comprising at least one".

The invention claimed is:

1. A rotor for a rotary electric machine, comprising:
   a rotor magnetic mass;
   a housing formed in the rotor magnetic mass; and
   at least two permanent magnets defining a first pole of the rotor and a second pole of the rotor adjacent to the first pole, the at least two permanent magnets being disposed in the housing on either side of a radial axis, which passes through the housing, of one of the poles,
   wherein among the at least two permanent magnets, permanent magnets inherent to the first pole contribute only to a polarity of the first pole and at least one shared permanent magnet contributes in part to the polarity of the first pole and in part to a polarity of the second pole.

2. The rotor as claimed in claim 1, wherein the housing is U-shaped or V-shaped.

3. The rotor as claimed in claim 1, which comprises, for one and the same pole, at least two housings, one housing having lateral branches parallel to lateral branches of the other housing.

4. The rotor as claimed in claim 1, which comprises at least one spacer disposed in the housing between the at least two permanent magnets.

5. The rotor as claimed in claim 4, wherein the spacer is disposed on the radial axis of the pole.

6. The rotor as claimed in claim 4, wherein the spacer comprises one or more longitudinal slots.

7. The rotor as claimed in claim 1, wherein the rotor magnetic mass comprises at least one pole piece connected to the rest of the rotor magnetic mass by tangential bridges that are formed between two ends of the housing and an outer surface of the rotor.

8. The rotor as claimed in claim 1, wherein the rotor magnetic mass comprises at least one pole piece that is independent of the rest of the rotor magnetic mass.

9. The rotor as claimed in claim 7, which comprises at least one tie rod for holding the at least one pole piece.

10. The rotor as claimed in claim 1, wherein the at least two permanent magnets are disposed in concentric rows.

11. The rotor as claimed in claim 1, which comprises a rotor mass holding the at least two permanent magnets and a non-magnetic shaft on which the rotor mass is disposed.

12. The rotor as claimed in claim 1, which has a number of poles less than or equal to 8.

13. A rotary electric machine comprising a rotor as claimed in claim 1 and a stator.

14. The machine as claimed in claim 13, wherein the stator comprises slots for receiving the windings, the slots being closed on an air gap side.

* * * * *